Dec. 5, 1961 O. VASSALLO ET AL 3,011,824
ADJUSTABLE AIR VENTS AND WIND PROTECTOR FOR INFANTS' CARRIAGES
Filed Oct. 2, 1959 2 Sheets-Sheet 1

INVENTORS
ONOFRIO VASSALLO
FRANK LA MARCA
BY BENJAMIN M. SCHAFFER

ATTORNEY

Dec. 5, 1961   O. VASSALLO ET AL   3,011,824
ADJUSTABLE AIR VENTS AND WIND PROTECTOR FOR INFANTS' CARRIAGES
Filed Oct. 2, 1959   2 Sheets-Sheet 2

INVENTORS
ONOFRIO VASSALLO
FRANK LA MARCA
BY BENJAMIN M. SCHAFFER

ATTORNEY

United States Patent Office 3,011,824
Patented Dec. 5, 1961

3,011,824
ADJUSTABLE AIR VENTS AND WIND PROTECTOR FOR INFANTS' CARRIAGES
Onofrio Vassallo, 9513 91st St., Ozone Park, N.Y.; Frank La Marca, 274 Woodbine St., Brooklyn, N.Y.; and Benjamin M. Schaffer, 184 Seiffert Court, Oceanside, N.Y.
Filed Oct. 2, 1959, Ser. No. 844,073
2 Claims. (Cl. 296—102)

This invention relates to a canopy or hood for a carriage or the like and particularly concerns a canopy provided with adjustable air vents.

A principal object is to provide a canopy mountable upon a carriage to shield an infant from wind, rain, sun and dust, the canopy being constructed to admit light and air in a draft-free cross ventilation arrangement.

A further object is to provide a canopy or hood for a carriage or the like, the canopy being provided with screened vent openings adjustably coverable by transparent flaps.

A further object is to provide a canopy or hood as described with a forward wall formed of flexible, transparent plastic material secured by slide fasteners.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
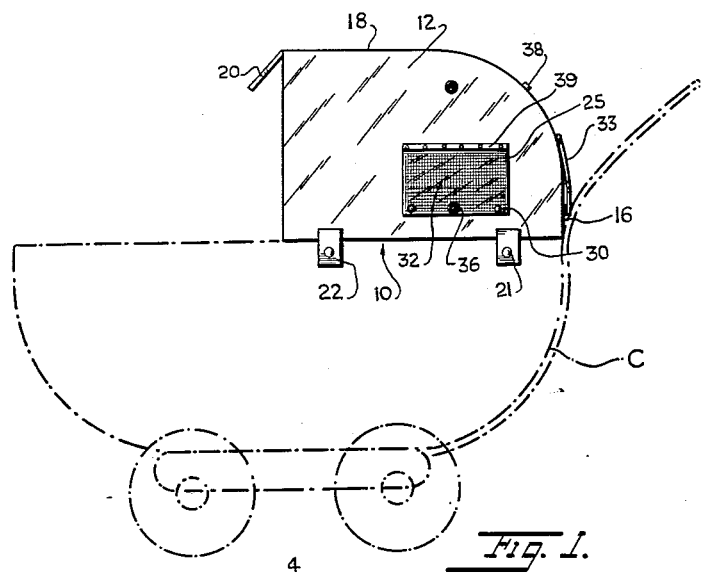
FIG. 1 is a side view of a canopy or hood embodying the invention.
Figure 3:
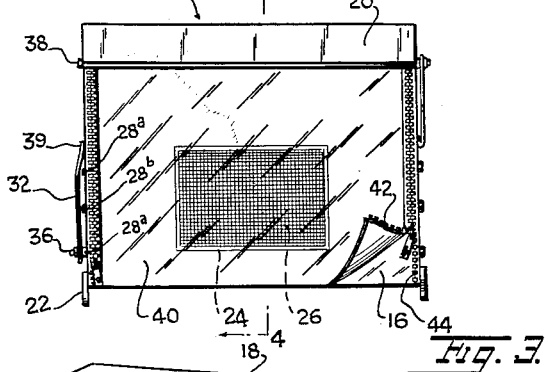
FIG. 3 is a front elevational view of the canopy, parts being shown turned up.

Referring to FIGS. 1–4, there is shown a canopy or hood 10 having a generally rectangular box-like structure with an open bottom. The canopy has vertical side walls 12, 14 and a rear wall 16 curved and integral with the top 18 of the canopy. A depending forward extension 20 is formed at the front end of top 18 to form a sunshade. Tabs 22 with holes 21 are secured to the bottom ends of the side walls for securing the canopy to a baby carriage C as indicated in dotted lines in FIG. 1. In the side and rear walls are formed openings 23, 24 in which are fitted wire or plastic mesh screens 26. Laterally spaced from the screened openings are rows of spaced snap fasteners 28ª, 28ᵇ, 28ᶜ. These fasteners can be selectively engaged by mating snap fasteners 30 secured near corners of flexible transparent plastic flaps 32, 33 mounted over the side and rear screened openings. The flaps are held in open positions by snap fastener elements 36 and 38 on the flaps and canopy walls, respectively. Edges 39 of the flaps are secured to the canopy walls. The front of the canopy is closed by a transparent, flexible plastic wall 40 having slide fastener elements 42 at the lateral edges detachably engaged with slide fastener elements 44 secured to the forward edges of side walls 12 and 14. As indicated in FIG. 3 by the turned corner of wall 40, it can be opened from the bottom upwardly to provide access to the interior of the canopy. Wall 40 serves as an effective wind shield while serving to admit light.

Figure 2:
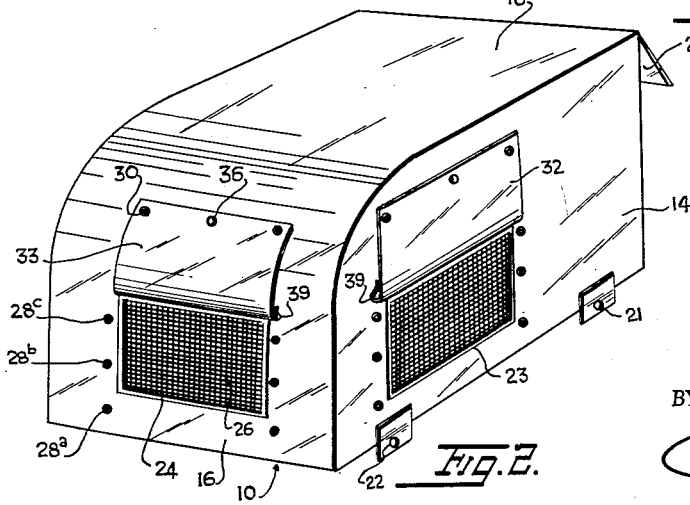
FIG. 2 is a perspective view of the canopy.
Figure 4:
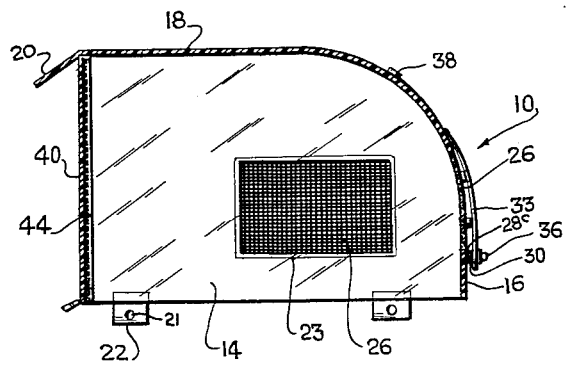
FIG. 4 is a sectional view taken on line 4—4 of FIG. 3.

The flaps 32, 33 are shown wholly open in FIG. 2. Flaps 32, 33 are shown fully closed in FIG. 1. In FIG. 4 flap 33 is wholly closed and in FIG. 3 one side flap 32 is open while the other side flap is closed. It will be readily apparent that the snap fastener elements 30 can be selectively engaged on the elements 28ª, 28ᵇ, 28ᶜ to cover more or less of the screened openings as desired.

The canopy walls 12, 14, 16 and 18 are preferably integrally formed of rigid material such as plastic, metal, wood or the like. Flaps 32, 33 and front wall 40 are preferably made of transparent plastic material such as heavy gauge vinyl or polyethylene.

Figure 5:
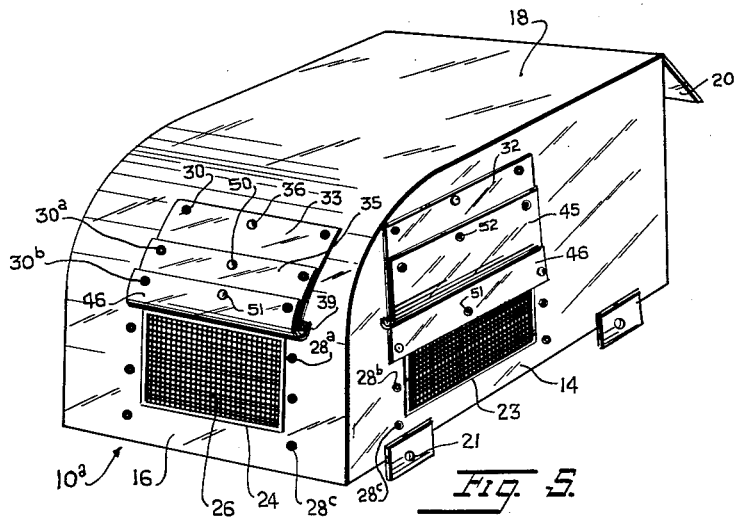
FIG. 5 is a perspective view similar to FIG. 2 of a canopy embodying another form of the invention.

In the form of the invention shown in FIG. 5, canopy 10ª has two additional flaps 45, 46 of successively shorter vertical widths secured in staggered arrangement at each of the larger flaps 32, 33. These auxiliary flaps permit the screened openings to be adjustably closed for desired ventilation of the interior of the canopy. Snap fastener elements 30ª and 30ᵇ on the auxiliary flaps may engage fastener elements 28ª and 28ᵇ, respectively. Fastener elements 30 will engage the lowermost snap fastener elements 28ᶜ on the canopy walls to fully close the screened openings and conceal the auxiliary flaps.

Snap fastener elements 50, 51 are provided on flaps 45, 46 and engage mating elements 52 on the larger flaps for holding one or both auxiliary flaps open on the fully open flaps 32, 33 as indicated in FIG. 5. The auxiliary flaps are also preferably made of transparent plastic material like flaps 32, 33.

There has thus been provided a canopy for protecting an infant in a carriage from wind, sun, rain and dust. The canopy construction admits daylight through the transparent front wall and screened wall openings whether or not they are covered by the transparent flaps. Draft-free cross ventilation is possible between the screened wall openings and this ventilation can be controlled by the adjustable setting of the flaps on the screened openings. Quick access to the interior of the canopy is had by the slide fastener arrangement of the front wall. The canopy structure keeps heat in the canopy in winter and passes cooling air in summer.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A canopy for a baby carriage or the like, comprising a hollow generally rectangular box-like body with an open bottom, said body having front, top, side and rear walls, said front wall being formed of flexible transparent material secured by slide fasteners to forward edges of said side walls, said side and rear walls having rectangular openings therein covered by screens, and flexible flaps adjustably securable over said openings by snap fasteners for controlling ventilation in said body, said snap fasteners including rows of spaced fastener elements at opposite sides of said openings and further fastener elements on said flaps, there being a plurality of said flaps at each of said openings, the flaps at each opening being of successively shorter width for selectively covering the opening by one of the flaps, each of said flaps being formed of transparent plastic material, and tabs with holes attached to the bottom ends of the side walls for detachably attaching the canopy to the body of a baby carriage.

2. A canopy for a baby carriage or the like, comprising a hollow generally rectangular box-like body with an open bottom, said body having front, top, side and rear walls, said front wall being formed of flexible transparent material secured by slide fasteners to forward edges of said side walls, said side and rear walls having rectangular openings therein covered by screens, and flexible flaps adjustably securable over said openings by snap fasteners for controlling ventilation in said body, said snap fasteners including rows of spaced fastener elements at opposite sides of said openings and further fastener elements on said flaps, there being a plurality of said flaps at each of said openings, the flaps at each opening being of successively shorter width for selectively covering the opening by one of the flaps, each of said flaps being formed of transparent plastic material, each of the flaps having a fastener element thereon for attaching the flap to the next wider flap, the widest flap having a fastener element detachably engageable with a mating fastener element on a wall of said body, and tabs with holes attached to the bottom ends of the side walls for detachably attaching the canopy to the body of a baby carriage.

References Cited in the file of this patent

UNITED STATES PATENTS

| | | |
|---|---|---|
| 916,439 | Grover | Mar. 30, 1909 |
| 922,069 | Walsh | May 18, 1909 |
| 1,233,032 | Cooley | July 10, 1917 |
| 1,758,110 | Hamel | May 13, 1930 |
| 1,770,841 | Clyman | July 15, 1930 |
| 2,191,005 | Wylie | Feb. 20, 1940 |
| 2,623,780 | Siebert | Dec. 30, 1952 |
| 2,815,243 | Campbell | Dec. 3, 1957 |

FOREIGN PATENTS

| | | |
|---|---|---|
| 309,673 | Great Britain | Apr. 18, 1929 |